Figure 1:
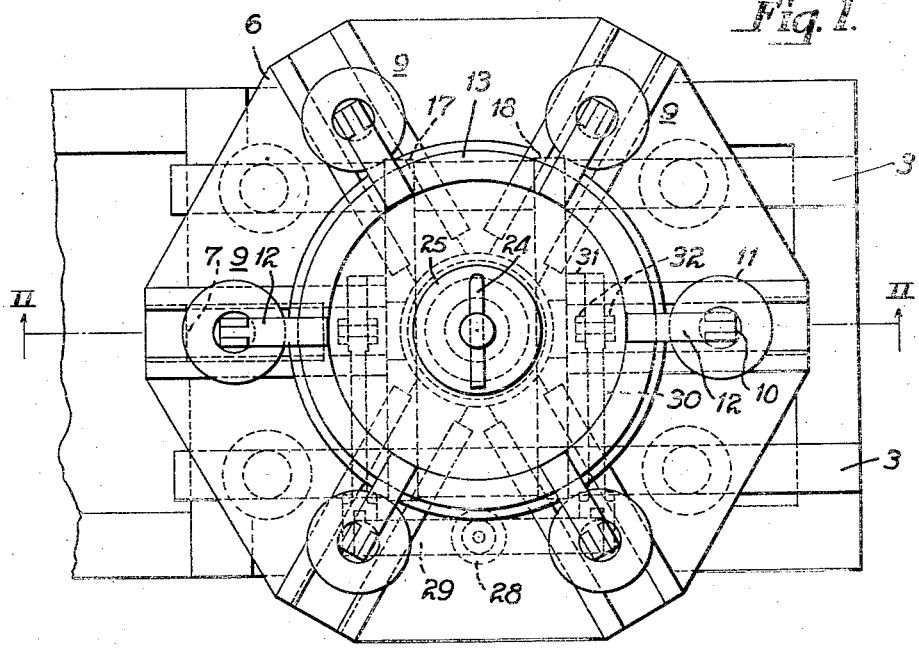

Jan. 30, 1940.  L. E. ENDSLEY  2,188,569
METHOD OF TREATING METAL WHEELS
Filed Jan. 14, 1938    2 Sheets-Sheet 1

INVENTOR
Louis E. Endsley,
By Archworth Martin
Attorney

Jan. 30, 1940.  L. E. ENDSLEY  2,188,569
METHOD OF TREATING METAL WHEELS
Filed Jan. 14, 1938  2 Sheets-Sheet 2
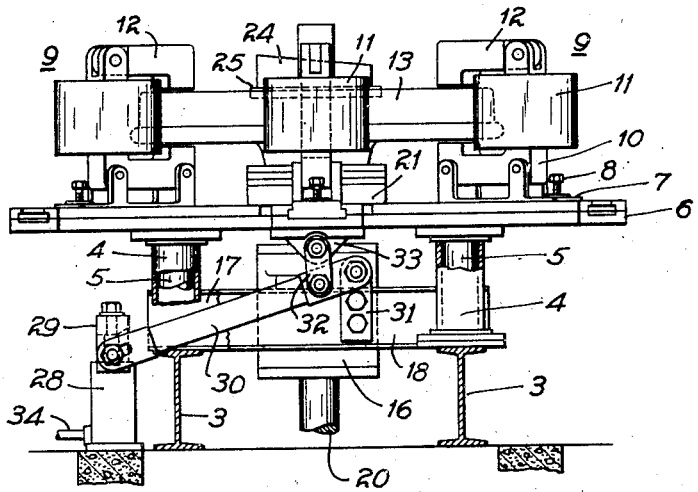
Fig. 3.
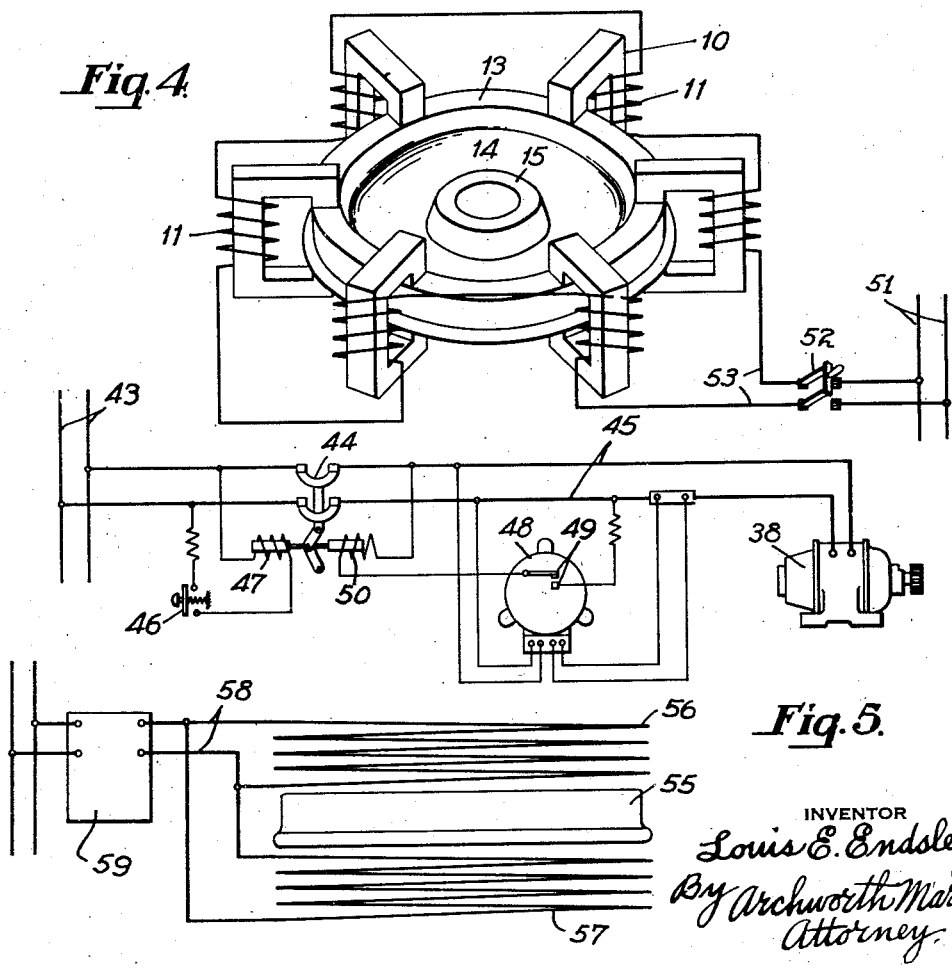
Fig. 4.
Fig. 5.
INVENTOR
Louis E. Endsley,
By Archworth Martin,
Attorney.

Patented Jan. 30, 1940

2,188,569

UNITED STATES PATENT OFFICE 2,188,569

METHOD OF TREATING METAL WHEELS

Louis E. Endsley, Pittsburgh, Pa., assignor to Edgewater Steel Company, Oakmont, Pa., a corporation of Pennsylvania Application January 14, 1938, Serial No. 184,984

4 Claims. (Cl. 148—10)

My invention relates to a method of treating metal wheels and similarly shaped articles, and is especially useful in the treatment of railway car wheels and the like, which have hub and rim portions connected by relatively thin plate portions or webs.

The invention has for its object the provision of a method for elimination or counteraction of stresses which are created through shrinkage of the wheel parts during cooling.

One manner of forming forged wheels involves the steps of piercing a blank at approximately its central portion and then rolling or otherwise forging the blank, to form the hub, plate and rim portions above referred to. The hub portion of the wheel will cool much more slowly than the rim portion thereof, with the result that the rim portion will contract in radial directions relative to the hub portion, thereby placing the plate portion of the wheel under compression, and tending to forge the plate into the hub which is still very hot. During this earlier stage, the plate and the rim become much cooler than the hub which, by reason of being much hotter than other points of the wheel, continues to shrink and develops a high tension radially in the plate.

In a standard car wheel, of approximately 33 in. diameter, with a 5½ inch tread and 3 inch rim thickness, the shrinkage of the hub will place the plate under very great stresses which may be to the elastic limit of the metal and perhaps to the extent of 40,000 lbs. to 60,000 lbs. per square inch.

Car wheels have also been manufactured and heat-treated by bringing the whole wheel up to the desired temperature and quickly cooling the tread surface by either immersing in water or spraying jets of water from a large number of small orifices or nozzles against the tread surface. This quick cooling of the tread hardens it and gives a longer life to the wearing surface, but causes the rim portion of the wheel to contract during the quick cooling, and as the hub and plate are still hot, this contraction forges the plate into the hub, so that when the hub and plate do cool off, the shrinkage due to cooling causes a high tension in the plate of the wheel in the same manner as if the wheel had been forged or rolled and thereafter not heat-treated.

In many cases the railways car wheels are formed with their web or plate portions dished or inclined relative to the rim and hub, as shown in the accompanying drawings, instead of being directly radial or perpendicular to the axis.

When differences of temperature are present in the hub and the rim, the forces imposed on the plate are not uniform from side to side, but one side or surface of the plate will be in tension and the other side in compression. This difference in stresses is produced by the moment brought about because the junction between the hub and the plate is in a different radial plane than the junction between the rim and the plate, so that when the hub cools off last it produces high tensile stresses at the oppositely disposed points of juncture of the plate with the hub and the rim, respectively. This surface tension in heat treated wheels mentioned above goes in some wheels to 60,000 lbs., or equal to the elastic limit. The treatment as herein described can reduce these stresses near the surface to practically zero, or if desired, can put these two points of high tension, as manufactured, over into a compression stress, if sufficient heat is put in the rim.

My invention contemplates the application of a radially-directed expansion force to the rims and plates of either cast or forged wheels, to such a degree as will increase the tensional forces created in the plate portion of the wheels through shinkage of the hubs during cooling. This force will be of such degree as will overstrain the plates somewhat above their elastic limits. To this end, I heat the rims to a temperature which will expand them to such an extent as to create the overstrain referred to. Cooling of the rims will relieve this stretching force on the plates, with the result that the plate and the rim will contract or shrink toward the center of the wheel. The plate having been stretched beyond its elastic limit in a radially outward direction, the metal thereof will be under much less strain than previous to the stretching operation. It is possible to heat the rim to such an extent that shrinkage thereof will actually place the plate under compression, but ordinarily I will heat the rim only to about 300° F. above room temperature.

In treating a wheel of the dimension heretofore referred to, the rim will be heated to an extent sufficient to stretch the plate and give it a permanent set without overstraining the rim, so that the rim will return to approximately its original position, with less maximum stress in the rim and the plate.

Wheels treated in this manner have the stresses in the plates thereof relieved to such an extent that there is much less danger of fracture, such as occasionally occurs in even those car wheels manufactured according to the various present approved practices. In recent years some of the train wrecks have been attributed to the breaking of car wheels as a result of unrelieved stresses in their plates.

Figure 2:
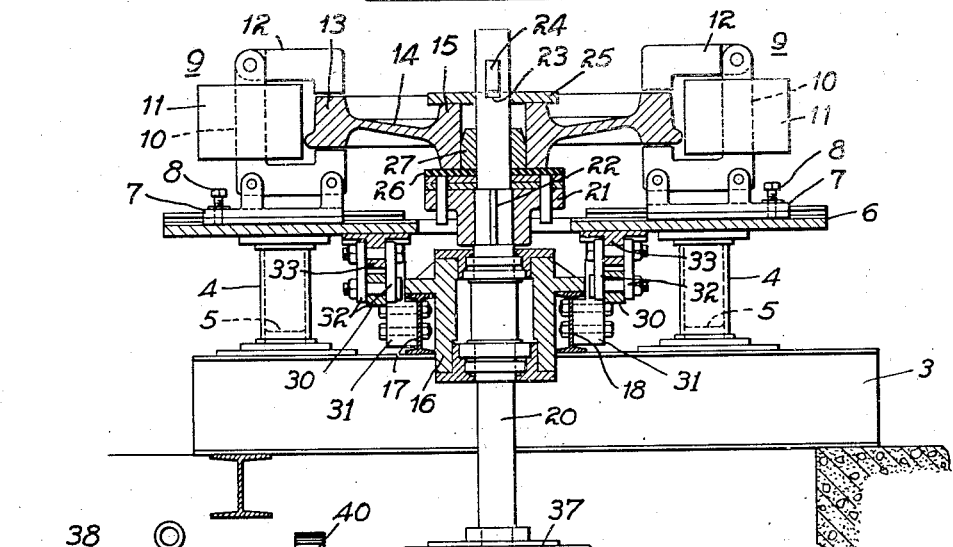

Some forms of apparatus whereby my invention may be practiced are shown in the accompanying drawings, wherein Figure 1 is a plan view of apparatus for heating wheel rims; Fig. 2 is a view thereof taken on the line II—II of Fig. 1; Fig. 3 is an end view partly in section; Fig. 4 is a diagrammatic view showing the electrical connections and circuits for the apparatus of Fig. 1, and Fig 5 shows another manner in which wheel rims may be heated.

Referring first to Figs. 1, 2 and 3, base frame members 3 serve as supports for telescopically-arranged pedestal or post sections 4 and 5 that support a table or platform 6 for movement to vertically adjusted positions, as hereinafter described. Mounted on the table 6 are a series of blocks or plates 7 which are radially movable in slideways on the table and are held in adjusted positions by set screws 8, so that these blocks can be properly positioned with respect to wheels of different diameters. Each of the plates carries an electro-magnet 9 comprising a C-shape core 10 and an energizing coil 11, the upper leg or pole 12 of the core being hinged to the back of the core, so that it can be swung into and out of position above the rim or tread 13 of a car wheel, the plate or web of the wheel being indicated by the numeral 14 and the hub thereof by the numeral 15.

A bearing block 16 is supported on beams 17 and 18, that are in turn carried by the base frame 3. A shaft 20 is journalled in the bearing block 16 and carries a seating block 21 which is keyed to the shaft at 22, for supporting the car wheels. Near its upper end, the shaft has a slot 23 for the reception of a wedge key 24 which, through the medium of a washer 25, will force the hub 15 of the wheel firmly against a friction member 26 of rubber or the like, upon an upper face of the seating member 21, so that the wheel will be firmly held thereon against slippage and will turn with the shaft when the shaft is rotated. A filler sleeve or thimble 27 on the shaft 20 receives the bore of the wheel and serves to prevent radial shifting of the wheel.

It will be seen that a wheel to be treated can readily be clamped to the shaft for rotation therewith, with the rim of the wheel positioned between the poles of the electro-magnets 9. Since wheels of the same type vary slightly in their dimensions between the side face of the rim and the side face of the hub on which the wheel is supported, the table is shifted vertically relative to the seating member 21 so that the poles of the electro-magnets will be positioned to receive the rim centrally therebetween with small air gaps between the poles and the adjacent sides of the rim 13.

The table 6 is raised and lowered by means of a jack device 28 which may be a hydraulic jack of any well-known form. The jack 28 has its plunger member secured to a bar 29. A pair of lever arms 30 are pivotally connected at their outer ends to the ends of the bar 29 and at their inner ends are pivotally connected to lugs 31 that are suitably secured to the beams 17 and 18. A pair of links 32 are provided for each lever 30 and are pivotally connected at their ends, respectively, to levers 30 and lug blocks 33 secured to the under side of the table 6. It will be seen that when pressure is admitted to the jack 28 through pipe 34, the bar 29 will be moved upwardly and, through the levers 30 and links 32, will raise the table 6, the posts 5 on the under side of the table serving to guide the table. The pressure in the jack 28 maintains the table in its adjusted position until the pressure is released. Thus, the table can be shifted vertically relative to the seating block 21, so as to bring the poles of electro-magnets 9 into position to receive the rims of car wheels therebetween.

The shaft 20 at its lower end is suitably journalled in a bearing block 36 and carries a bevel gear 37 which is keyed thereto. The gear wheel 37 and the shaft 20 are driven from a motor 38 through a pinion 39, a gear wheel 40, a shaft 41 and a bevel pinion 42. The shaft 20 can suitably be rotated at about 330 R. P. M.

The rim of the wheel is caused to rotate in the magnetic field of each of the magnets 9 when the coils 11 thereof are energized—preferably from a D. C. source, the total field strength of these magnets being of such intensity that with the wheel rotating at about 330 revolutions per minute, heating currents of such value will be produced in the rim as will cause the rim to be increased in temperature approximately 300° F., within one or two minutes. The rim is heated throughout its entire cross-sectional area substantially simultaneously by these electrical currents in the rim, all parts of the rim being heated to substantially a uniform temperature. In car wheels of certain standard sizes, this would represent about 5,000 to 6,000 B. t. u. During rotation of the wheel the table and the electro-magnets are held stationary by the table posts 5.

Referring to Fig. 4, electrical current for the coils of the magnets is supplied from a D. C. line 51, through knife-switch 52 and conductors 53. Electrical energy for the driving motor 38 is supplied from a line 43, through a circuit breaker switch 44 and conductors 45. A manually-controlled switch 46 is provided for closing the circuit through a solenoid 47, which will cause the switch 44 to be moved to the closed position shown. The switch 52 is closed to provide the magnetic fields after the motor has been set into operation and the shaft 20 brought up to its running speed.

In order to increase the effectiveness of the heating currents induced in the rim, I preferably employ an even number of electro-magnets 9 and arrange them so that each magnet is of opposite polarity with respect to the polarity of adjacent magnets. That is, during rotation of the wheel, a point on the rim passes successively through flux lines moving in opposite directions, since the north and south poles of one magnet are arranged oppositely to the north and south poles of the adjacent magnets.

Since the value of the currents induced in the rim of the wheel is dependent upon rim speed and magnetic field strength, and the time required to heat the rim is dependent upon the value of the induced currents, the time required to heat the rim can be varied by changing the rim speed, the field strength or by utilizing a greater or lesser number of electro-magnets. However, the power required to effect a given increase in the temperature of the rim will be equal to the power expended in the motor 38, less the mechanical and electrical losses of the apparatus employed. Thus, the current supplied to the motor 38 affords an accurate index to the rise in rim temperature for a given size wheel, so that the heating of wheels of any size can easily be controlled by controlling the amount of energy supplied to the motor 38.

Thus, in order to insure against underheating or overheating of the wheel rim, I provide means, such as a watt-meter relay 48, of any well-known suitable form, for automatically effecting opening of the switch 44. This meter relay is connected to the conductors 45, and when a predetermined number of watts have been expended by the motor 38 to rotate the wheel, switch contacts 49 of such relay will close, resulting in energization of a solenoid 50 which will move the switch 44 to open position.

The heating of the wheel rim effects expansion thereof and consequently creates radial stress sufficient to overstrain the plate 14 of the wheel, as heretofore explained. The rim of the wheel can be permitted to cool in the air and upon cooling thereof, the strain on the plate portion 14 of the wheel will be removed. The rotation of the wheel rim in a series of magnetic fields distributed in an annular path, results in rapid and quite uniform heating thereof.

In Fig. 5, I show a wheel 55 whose rim is heated by electric current induced therein by coils 56 and 57, which are disposed at opposite sides of the rim of the wheel and are connected to a source of high frequency A. C. by conductors 58; the current induced in the rim causing rapid increase in the temperature of the rim portion, the wheel preferably being rotated during heating of the rim to effect substantially uniform heating at all points around the rim.

Within a suitable housing 59, I provide control apparatus for automatically controlling flow of electric energy through the conductors 58 in the same manner that current flow through the conductors 45 of Fig. 4 is controlled, the control apparatus within the housing 59 comprising a switch and associated control mechanism which corresponds to the switch 44 and the control mechanism therefor, of Fig. 4. After a predetermined quantity of electrical enrgy has been supplied to the coils 56 and 57, the control apparatus operates to automatically interrupt current flow through the conductors 58, thus effecting proper heating of the rim of the wheel.

The advantage of rapidly heating the rim is to effect the desired difference in temperature as between the rim and the hub portion very quickly, so that no heat will be transmitted back into the plate and hub and thus require a greater rim temperature for doing the work. This difference in temperature is quickly established without material heat losses when the rim is heated by electrical currents induced therein, as above described, since such currents are effective to raise the temperature simultaneously at all points throughout the cross sectional area of the rim. Thus, the rim is heated interiorly at the same time that it is heated exteriorly, the heating rate being substantially uniform at all parts of the rim so that no undesirable stresses are set up in the rim by thus heating the same.

I claim as my invention:

1. The method of relieving stresses in a finished wheel that has a hub portion, a rim portion and a plate portion, which comprises heating the rim by induced electrical currents to a temperature below any temperature at which the rim would be appreciably softened, but to such degree in excess of the temperature of the plate that it will expand sufficiently to strain the plate portion beyond its elastic limit, and thereupon interrupting the application of heat and permitting the rim to become cooled.

2. The method of relieving stresses in a finished wheel that has a hub portion, a rim portion and a plate portion, which comprises heating the rim by rotating it through a magnetic field to a temperature below any temperature at which the rim would be appreciably softened, but to such degree in excess of the temperature of the plate that it will expand sufficiently to strain the plate portion beyond its elastic limit, and thereupon interrupting the application of heat and permitting the rim to become cooled.

3. The method of treating a metal wheel having a hub portion, a rim, and a plate portion, which comprises hardening the rim by quenching it while in a heated condition, thereafter relieving stresses in the wheel by electrically heating the rim portion thereof to a temperature below any temperature at which the rim would be appreciably softened, but to such degree in excess of the temperature of the plate that it will expand sufficiently to strain the plate portion beyond its elastic limit, and thereupon interrupting the application of heat and permitting the rim to become cooled.

4. The method of relieving stresses in a finished wheel which has a hub portion, a rim portion and a plate portion, which comprises electrically heating the rim to a temperature approximately 300° F. in excess of the temperature of the plate portion, but below any temperature at which the rim would become appreciably softened, and thereupon interrupting the application of heat and permitting the rim to become cooled.

LOUIS E. ENDSLEY.